July 9, 1929.  J. B. KENNEDY ET AL  1,720,080
FASTENER
Filed May 24, 1926
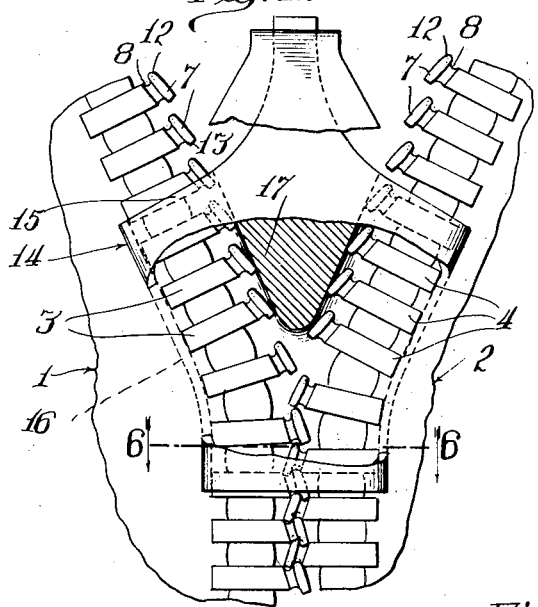
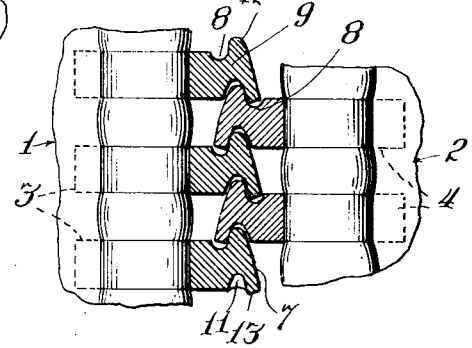
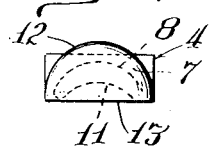
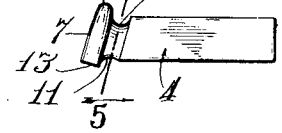
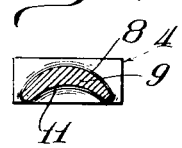
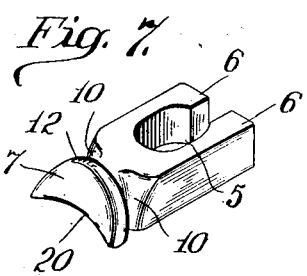
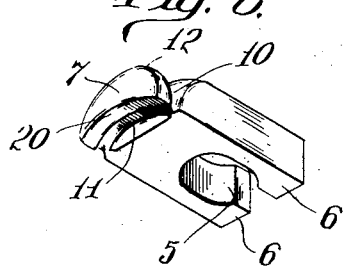
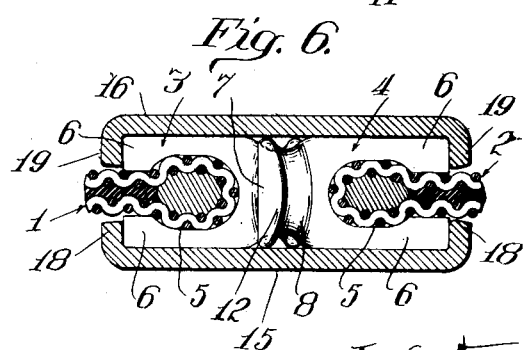
Inventors.
John B. Kennedy
and August H. DeGroote
By Eugene M. Giles
Attorney.

Patented July 9, 1929.

1,720,080

UNITED STATES PATENT OFFICE.

JOHN B. KENNEDY AND AUGUST H. DE GROOTE, OF MISHAWAKA, INDIANA, ASSIGNORS TO MISHAWAKA RUBBER AND WOOLEN MANUFACTURING COMPANY, OF MISHAWAKA, INDIANA, A CORPORATION OF INDIANA.

FASTENER.

Application filed May 24, 1926. Serial No. 111,134.

Our invention relates to fasteners of the type wherein opposed series of interlocking elements are engaged and disengaged by a cam member which slides along the series of elements for this purpose.

In fastening devices of the character to which this invention relates, it is required in many cases that the interlocked fastener may be flexed or doubled over quite sharply and it is important that the elements be arranged to bend or flex freely and easily without cramping or binding, so as to avoid undue strain on the stringers or attaching parts of the elements and prevent crowding of the elements sidewise out of engagement. It is also an advantage to construct the elements so that they interlock adequately without necessitating any considerable overlap as the operations of interlocking and releasing are thereby facilitated and shorter elements may be used. A common form of fastener of this character consists of elongated flat members, each of which has at the outer end, a projection on one side and a recess on the other side arranged so that when the ends of the opposed elements are overlapped, the projections of each series are engaged in the recesses of the other series of elements. With this construction however, the portion of the fastener element at the extreme end which passes over and engages behind the projection of the element on the opposite side, engages against the lateral edges of the latter element when the fastener is doubled over sharply and regardless of the particular shape of the projection, causes a prying action to take place between the adjoining interlocked elements, and this not only imposes excessive strain on the stringer and mounting portions of the fastener element but also has a tendency to push the elements sidewise out of engagement.

The principal objects of our invention are to permit perfect freedom of bending or flexing of the interlocked fastener; to provide fastener elements which are particularly designed for relative adjustment in the manner required in lateral bending or flexing of the fastener; to avoid prying or cramping action between the adjoining elements when the fastener is flexed or doubled over; to afford clearance to accommodate the inserted ends of the elements as they are tilted laterally; to provide interlocking portions which afford an adequate connection with a small amount of overlapping of the ends of the opposed elements; and in general, to provide a simple form of fastener element which gives the fastener a high degree of flexibility and avoids the undesirable cramping or prying action between the adjoining interlocked elements when the fastener is flexed or doubled over.

On the drawings:

Fig. 1 is a front view of a fragmentary portion of a fastening device embodying our improvements, with a portion of the operating member or slider broken away to disclose the action of the elements in interlocking and releasing;

Fig. 2 is an enlarged sectional view of a number of interlocked fastener elements, taken in the plane of the stringers upon which the elements are mounted;

Fig. 3 is a side view of one of the fastener elements;

Fig. 4 is an end view thereof;

Fig. 5 is a sectional view on the line 5—5 of Fig. 3;

Fig. 6 is an enlarged sectional view, taken substantially on the line 6—6 of Fig. 1; and Figs. 7 and 8 are top and bottom perspective views, respectively of one of the fastener elements in a slightly modified form.

Referring to the drawings, the reference numerals 1 and 2 indicate fragmentary portions of the stringers upon which the fastener elements 3 and 4 are mounted in any convenient manner. The elements 3 and 4 which are alike, are preferably in the form of elongated plates and may be formed with apertures 5 affording jaws 6 with inturned ends which are clamped upon the enlarged edge portions of the stringers 1 and 2 in the usual manner.

The elements 3 and 4 are arranged in staggered relation as shown and spaced apart a suitable distance to receive the ends of the opposed elements therebetween, and said elements are formed at their outer ends with a substantially semi-circular head 7 which is preferably arranged at a slight angle to the longitudinal axis of the element and immediately back of the semi-circular head 7, the element is necked in any convenient manner as for example, by providing a groove 8 extending over the neck 9 and from edge to edge of the elements as shown in Figs. 3 and 5, or the elements may be provided immediately back of the head with a notch at each side such as indicated at 10 in Fig. 7. The elements 3 and 4 are provided on the under side immediately back of the head 7 with a transverse, preferably arcuate groove 11, and in the interlocking of the elements the transverse groove 11 engages the arcuate edge 12 of the head 7.

With this construction the arcuate edge 12 extends from edge to edge of the elements so that the next succeeding element which has the groove 11 engaged with said edge 12, may rock or slide along the edge 12 when the interlocked fastener is bent or doubled over. Moreover, in view of the clearance afforded by the side portions of the groove 8 or the lateral notches 10, the extreme forward edge 13 of the element which in the interlocked position, engages over and is located immediately behind the edge 12 of the head 7, is free to rock or tilt down into the lateral portions of the groove 8 or the notches 10 and thus avoids the usual cramping or prying action between the adjoining interlocked elements which has occurred heretofore with elements of the projection and recess type.

The elements 3 and 4 are interlocked and released in the usual manner by a slider 14 comprising front and rear wings or plates 15 and 16 respectively, which are widened out at their upper ends and held in spaced relation by a wedge shaped connecting portion 17, and the plates 15 and 16 have the side edges inturned as indicated at 18 and 19 respectively to provide open sided divergent channels meeting at the apex of the wedge shaped portion 17 in a common channel so that when the slider or operating member 14 is moved along the series of fastener elements 3 and 4, these elements are interlocked and released in the usual manner, according to the direction of movement of the slider 14.

The fastener elements of Figs. 7 and 8 are substantially the same as the elements shown in the preceding figures except that notches 10 are provided at the opposite sides just back of the head of the element instead of the continuous groove such as shown at 8 in Fig. 5 and moreover, the end edge of the element is curved as indicated at 20 instead of straight as is the edge 13 of the element shown in Fig. 4.

It will be noted that in addition to the perfect freedom of adjustment of the interlocked fastener elements in the bending or flexing of the fastener, the interlocking portions of the elements merely comprise a narrow arcuate edge portion 12 and a correspondingly narrow recess 11 instead of a wide projection and a wide recess such as has been heretofore used. In view of the present construction with the narrow edge and the narrow transverse groove, the elements do not have to be inserted any considerable extent between the elements of the adjoining series as in the projection and recess type of fasteners heretofore in use; and by reason of this lesser amount of overlap required in the present construction, the interlocking and releasing operations are facilitated, while the interlocking effect is in no wise impaired.

While we have shown and described our invention in a preferred form, we are aware that various changes and modifications may be made without departing from the principles of our invention, the scope of which is to be determined by the appended claims.

We claim as our invention:

1. In a fastening device of the class described, the combination of a fastener element with mounting means at one end and having at the other end a head substantially in the form of a segment of a disk arranged transversely of the longitudinal axis of the element so that a side face of the segment forms the end face of the element.

2. In a fastening device of the class described, the combination of a fastener element with mounting means at one end and a head at the other end substantially in the form of a segment of a disk and lying in a plane transverse to and at an inclination to the longitudinal axis of the element.

3. In a fastening device of the class described, the combination of a fastener element with mounting means at one end and a reduced neck at the other end terminating in a head having substantially the form of a segment of a disk lying in a plane transverse to and intersecting the longitudinal axis of the element.

4. In a fastening device of the class described, the combination of a fastener element with mounting means at one end and a reduced crescent shaped neck portion at the other end having substantially a marginal bead extending around the outer end of the neck portion.

5. In a fastening device of the class described, the combination of opposed series of fastener elements and a slider operable therealong for interlocking and releasing same, each of said elements having a neck portion terminating in a flat head substantially in the form of a semi-circular disk and having an arcuate edge extending across the top of the element, and each neck portion having a transverse groove arranged so that the arcuate edges of the elements of each series engage in the transverse grooves of the elements of the other series.

6. A fastener element for a fastening device of the class described, said element having mounting means at one end and a rib at the other end extending arcuately across the top of and down the sides of the element and a transverse groove in the under side of the element adjacent the latter mentioned end.

7. The combination of parts composed of flexible material and having opposed edges, a series of fastener elements on each opposed edge and a member slidable along the series of elements for interlocking and releasing same, said elements of both series having projecting ends with a narrow rib on one side extending convexly from edge to edge and down the sides of the element and a concave transversely extending recess on the other side so that said ribs on the ends of the elements of each series engage in the recesses of the elements of the opposed series.

8. In a fastening device of the class described, the combination of a fastener element comprising an elongated flat member having a continuous groove extending across the top and bottom adjacent one end to form a flat transversely elongated head, the latter having edge portions adapted to interengage and interlock with corresponding grooves of similar opposed elements.

9. The combination of a fastener element for a fastening device of the class described, said element having a recess at one side and a projection at the other side, and notches in the latter side of and at the edges of the element adjacent the inner side of the projection.

10. In a fastening device of the class described, the combination of opposed series of flat fastener elements, each having a recess in one side and a rounded projection at the other side extending from edge to edge, a slider operable along the series of elements for inserting the ends of the elements of one series between the ends of the elements of the other series with the projections of the elements of the other series and with the extremities of the elements located at the inner sides of the projections of the opposite series of elements, said elements being cut away at the edges to afford clearance for such extremities in lateral bending of the interlocked series of fastener elements.

11. The combination of opposed fastener elements of the class described, each having a transversely rounded projection on one side extending from edge to edge and a transversely extending recess on the other side and a transverse edge beyond the recess, the latter edge being adapted to extend transversely across the adjoining opposed fastener element at the inner side of the projection of the latter element in the interlocked position, said latter element being notched on the projection side at each edge to afford clearance for the aforesaid transverse edge of the adjoining opposed element and prevent cramping between the adjoining interlocked elements when the interlocked fastener is bent laterally.

JOHN B. KENNEDY.
AUGUST H. DE GROOTE.